Dec. 17, 1940.   D. W. AULD ET AL   2,225,252
REMOTELY CONTROLLED CONNECTOR APPARATUS
Filed Sept. 22, 1939   6 Sheets-Sheet 5
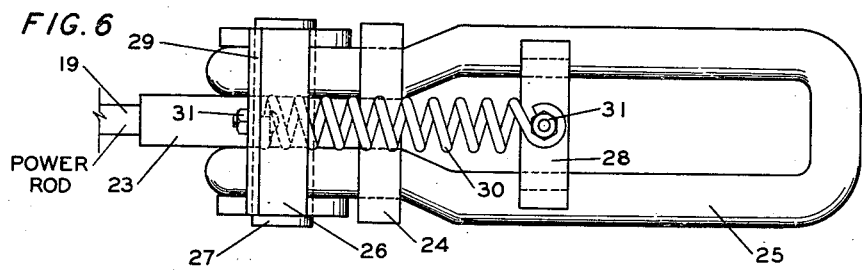
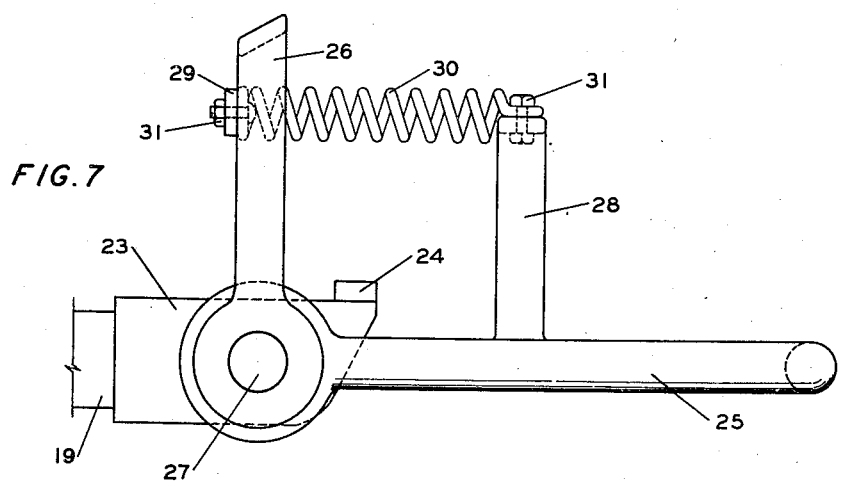
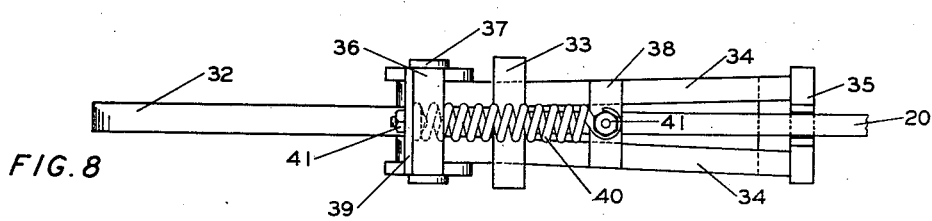
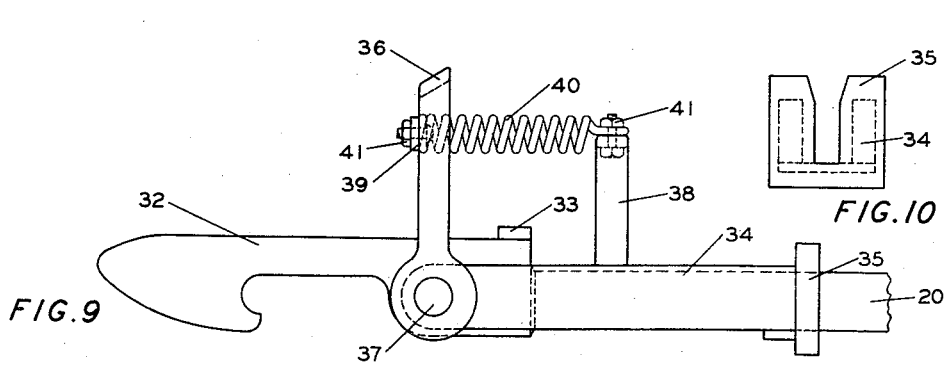
INVENTOR
L. J. WEBER
D. W. AULD
BY
Hudson, Young, Shanley + Younger
ATTORNEY Dec. 17, 1940.    D. W. AULD ET AL    2,225,252
REMOTELY CONTROLLED CONNECTOR APPARATUS
Filed Sept. 22, 1939    6 Sheets-Sheet 6

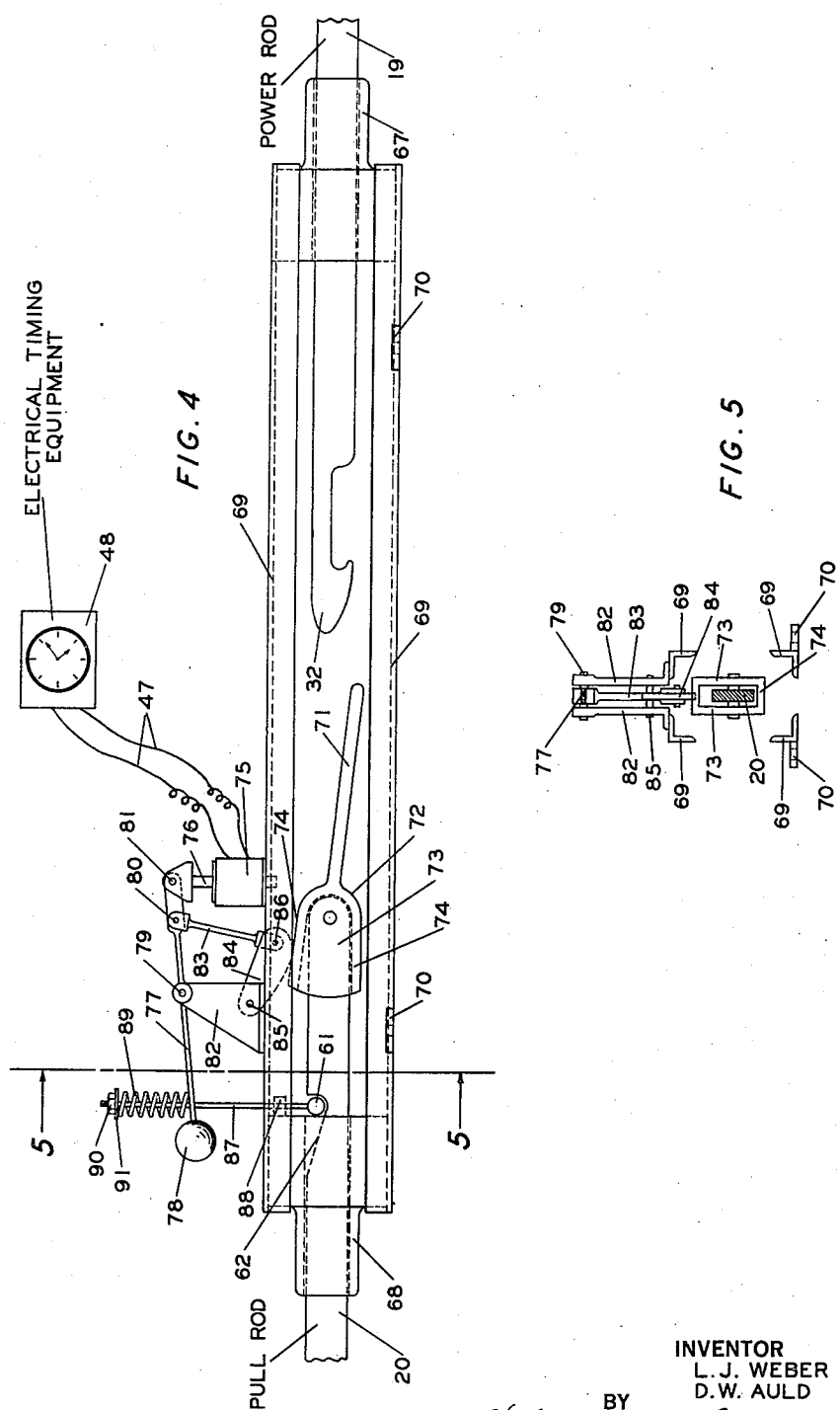

INVENTOR
L. J. WEBER
D. W. AULD
BY
ATTORNEY

Patented Dec. 17, 1940

2,225,252

UNITED STATES PATENT OFFICE 2,225,252

REMOTELY CONTROLLED CONNECTOR APPARATUS

Donald W. Auld and Louis J. Weber, Bartlesville, Okla., assignors to Phillips Petroleum Company, a corporation of Delaware Application September 22, 1939, Serial No. 296,164

18 Claims. (Cl. 74—593)

This invention relates to remotely controlled apparatus that is adapted to connect and disconnect members which are arranged to reciprocate in the direction of power transmission. While this invention may be employed with various types of equipment in which power is transmitted in a reciprocating manner, it is especially applicable for connecting and disconnecting power rods to and from pull rods in deep well pumping systems.

In the pumping of oil wells in which production has diminished to such an extent that it is no longer economical to pump each individual well by means of a separate unit, it has been the practice for many years to operate a group of neighboring wells by means of a central power unit. As the productivity of a well becomes further decreased, it will eventually reach the stage where it is neither economical nor practical to pump the same continuously. Under these circumstances, each well is connected to and operated by the central power unit for only sufficient periods each day to remove bottom hole accumulations of oil. This procedure requires the attendance of a "lease pumper" whose duties include connecting and disconnecting particular wells to and from the central power unit at the proper time each day. The connections are made manually by means of the commonly known hook-on and hook-off device which is used to couple the horizontally reciprocating power rods to pull rods extending to the pump jack. Also, present day hook-on and hook-off devices are extremely hazardous as they are frequently the cause of grave injury to the "lease pumper."

The practice of our present invention obviates the difficulties experienced heretofore and provides for hook-on and hook-off apparatus which is remotely controlled so as to place individual pumps in and out of service at predetermined intervals and for desired periods of time. The operation of our device is fully automatic and is intended to perform all of the functions of manually controlled hook-on and hook-off devices in a highly dependable and satisfactory manner. After our apparatus is once installed and adjusted to operate on a particular cycle, it is unnecessary to readjust the same for any purpose except when it is desirable to alter the cycle to conform with changing conditions within the well.

The only duties required of the pumper are those pertaining to general maintenance. The pumper will therefore have more time to supervise the operation of his lease, and in many cases may be able to take care of a greater number of wells than formerly. Additionally, the possibility of injury to the pumper during hook-ons and hook-offs is completely eliminated. The human factor is also eliminated by the use of our device as there is no danger of costly damage to pumping equipment which usually occurs when the pumper, through negligence, permits one or more pumps to function for prolonged unproductive periods.

It is the primary object of our present invention to provide means whereby a reciprocating power transmitting member may be connected to or disconnected from a reciprocating power utilizing member at will and without the aid of an attendant.

Another object of this invention is to automatically hook-on and hook-off rod line well pumping equipment by means of apparatus which is controlled from a point remote from the site where the hook-on and hook-off operations take place.

A further object of this invention is to provide remotely controlled connector apparatus for placing reciprocating members in and out of service at predetermined intervals and for desired periods of time.

This invention has for a still further object the provision of apparatus of the character indicated, which apparatus is simple and sturdy in construction; positive and dependable in operation; and relatively inexpensive to manufacture, install, operate, and maintain.

These and other objects and advantages, as well as basic forms of construction and operation of this invention, will be best understood by referring to the following detailed description taken in conjunction with the accompanying drawings which form a part of the specification and wherein like numerals of reference pertain to similar parts throughout. In order that the instant invention may be set forth in a clear, complete and readily comprehensible manner, we are including herein three preferred embodiments of the same.

In the drawings:

Figure 4 is a side elevation view of a third embodiment of this invention;

Figure 5 is a transverse cross section view taken along line 5—5 in Figure 4;

Figure 6 is a top plan view of the mechanism connected to the end of the power rod in Figures 1 and 2;

Figure 7 is a side elevation view of Figure 6;

Figure 8 is a top plan view of the hook and knock-off block arrangement shown in Figure 1;

Figure 9 is a side elevation view of Figure 8;

Figure 10 is an end elevation view of the knock-off block shown in Figures 1, 8 and 9;

Figure 1:
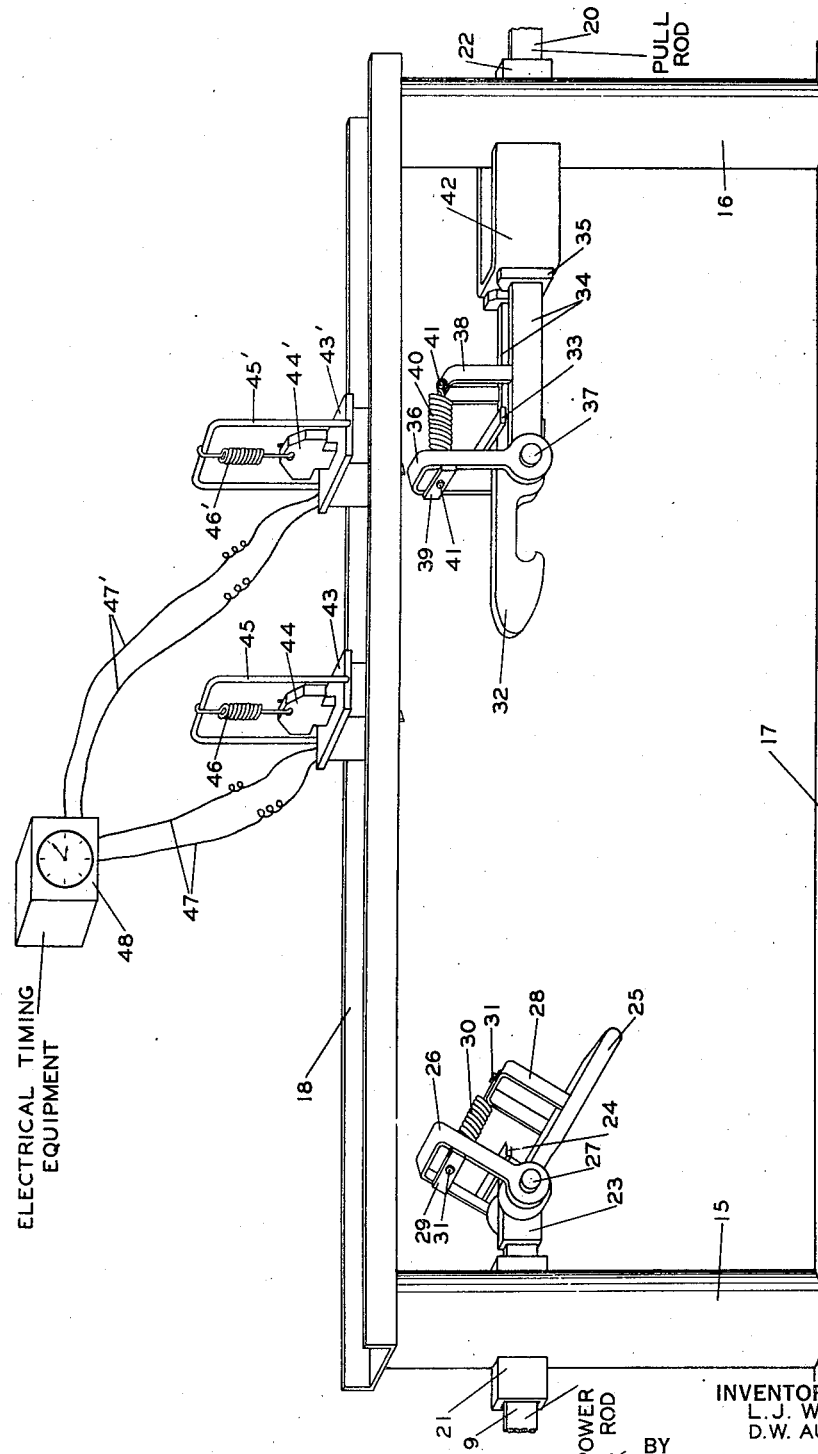
Figure 1 is a perspective view of an embodiment of our invention in which a pair of electric solenoids are employed to place the apparatus in hook-on or hook-off position, as desired.

Referring to the embodiment of our invention illustrated in Figure 1, we have denoted therein a frame-work consisting of a pair of posts 15 and 16, positioned vertically in the ground 17, and a channel 18 supported in a substantially horizontal plane across the top-end of the posts. A power rod 19, which is connected to and operated by a central power unit (not shown), and a pull rod 20, which is attached to the usual line rods and pumping jack (also not shown), are arranged to reciprocate through guide sleeves 21 and 22 in posts 15 and 16, respectively.

An end member 23 having a bar 24, is affixed to power rod 19 by welding, or any other suitable method. A loop 25, which forms one unit of a 2-unit coupling, and a pull-up link 26 are each pivotally mounted on a common pin 27 which extends through end member 23. While loop 25 is shown as being pivotally mounted to end member 23, it is to be clearly understood that the loop may be hinged or connected to the end of the power rod in any other manner which will allow relative movement between these parts. By means of a U-bracket 28, a plate 29, a coil spring 30 and bolts 31, loop 25 and pull-up link 26 are maintained in the relative position illustrated in Figure 7. It will be observed that the combined weight of loop 25 and bracket 28 is sufficient to tilt the assembly mounted on pin 27 so that pull-up link 26 will rest against the rear edge of a bar 24 when our device is in hook-off position.

A hook 32 carries a bar 33 and is rigidly connected to pull rod 20. This hook constitutes the other unit of the aforementioned coupling. While we prefer to employ a pivotally mounted loop on the power rod and a fixed hook on the pull rod, it will be evident that our invention will operate successfully if the hook is mounted on the power rod and the loop is connected to the pull rod; also, either the hook or the loop may be pivoted regardless of whether they are attached to the power rod or the pull rod for the purposes of our invention. A knock-off block, consisting of a pair of arms 34 and a notched end plate 35 welded thereto, and a pull-up link 36 are each pivotally mounted on a pin 37 which passes through hook 32. U-bracket 38, plate 39, coil spring 40, and bolts 41 correspond to similar parts already described on the power rod and cooperate with the knock-off block, pull-up link 36 and pin 37 to form a unitary assembly. When our apparatus is in hook-off position, as illustrated in Figure 1, the knock-off block abuts against a stop 42 extending sidewardly of post 16, and maintains hook 32 in a desired predetermined position.

A pair of electric solenoids 43 and 43' are supported on channel 18. These solenoids are provided with armatures 44 and 44', having their lower ends extending through and below channel 18 and being suspended on brackets 45 and 45' by means of coil springs 46 and 46'. Conductors 47 and 47' place each of the solenoids in electrical connection with electric timing equipment 48 which may include a source of electrical power and a suitable electric time clock for energizing the respective solenoids at predetermined times. The electric timing equipment is housed at a point distant from the well and the same equipment may be used to control the hook-on and hook-off of each well operated by the central power unit. Armatures 44 and 44' are normally in raised position when the electric current is cut off. As soon as current is supplied to a particular solenoid, its armature moves downwardly against the action of its spring.

The operation of the apparatus shown in Figure 1 is as follows:

Power rod 19 reciprocates back and forth through guide sleeve 21 until such time as it is desirable to effect a hook-on of the apparatus. The electrical timing equipment 48, having been previously set to operate on a given time cycle, completes the circuit to solenoid 43 at the proper instant and energizes the same, causing armature 44 to move downwardly against the action of its spring 46. As the power rod moves toward the right on its next stroke, the upper edge of pull-up link 26 comes in contact with the lower end of armature 44; and further movement of the power rod toward the right causes loop 25 to be raised and placed in contact with the lower outer curved portion of the hook. Continued movement of the power rod to the right causes loop 25 to ride along the lower outer curved portion of the hook and thence into the open portion of the hook on completion of the forward stroke. As the power rod starts its back stroke, loop 25 engages hook 32, moving hook 32, the knock-off block, and pull rod 20 toward the left. This causes the knock-off block to be removed from stop 42 and, due to the weight of arms 34, all of the mechanism pivotally supported on pin 37 is tilted downwardly. A complete hook-on will have been effected at this point, and the pull rod reciprocates with the power rod to thereby operate the well to which it is connected. The electrical timing equipment is arranged to energize solenoid 43 for a period sufficient to allow for two or three strokes of the pull rod, at the end of which time the circuit is opened, permitting coil spring 46 to move armature 44 upwardly and out of the way of the reciprocating equipment. When the well has been pumped for the desired period, the electric timing equipment automatically completes a circuit to solenoid 43', causing armature 44' to move downwardly against the action of coil spring 46'. During the next movement of pull rod 20 toward the right, the upper edge of pull-up link 36 comes in contact with the lower end of armature 44'; and continued movement of the pull rod toward the right raises knock-off block to the position illustrated in Figure 1, thereby stopping the pull rod before completing its normal furthermost movement or stroke to the right. Power rod 19 will, however, continue for its full stroke to the right, thereby moving loop 25 into the open portion of hook 32. Loop 25 will then be tilted downwardly, due to the force of gravity, until pull-up link 26 rests against the rear edge of bar 24; and the power rod will be disconnected from the pull rod.

Figure 2:
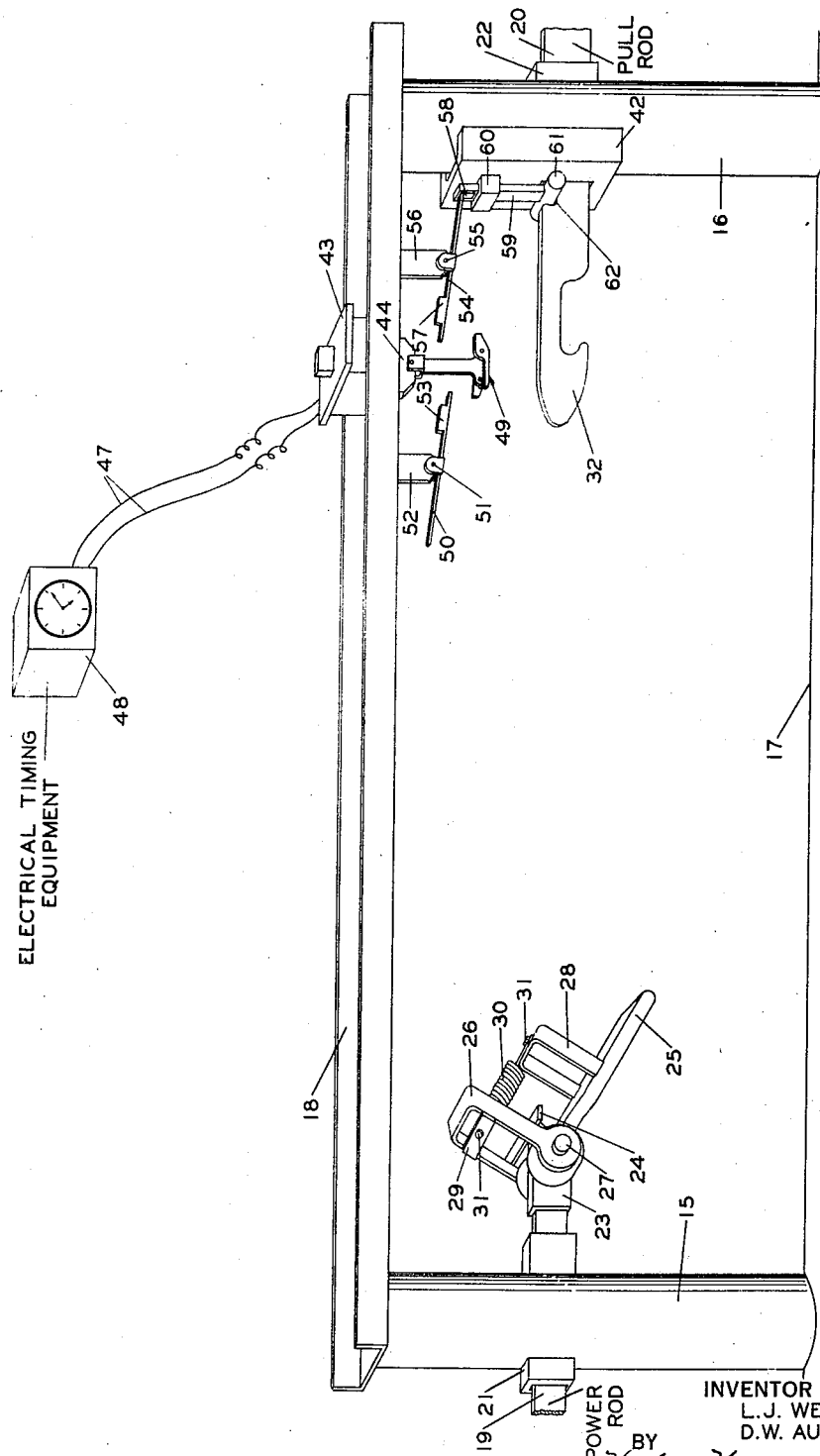
Figure 2 is a perspective view of a form of our invention employing a single solenoid and illustrating the relationship of the various parts when the same are in hook-off position.
Figure 3:
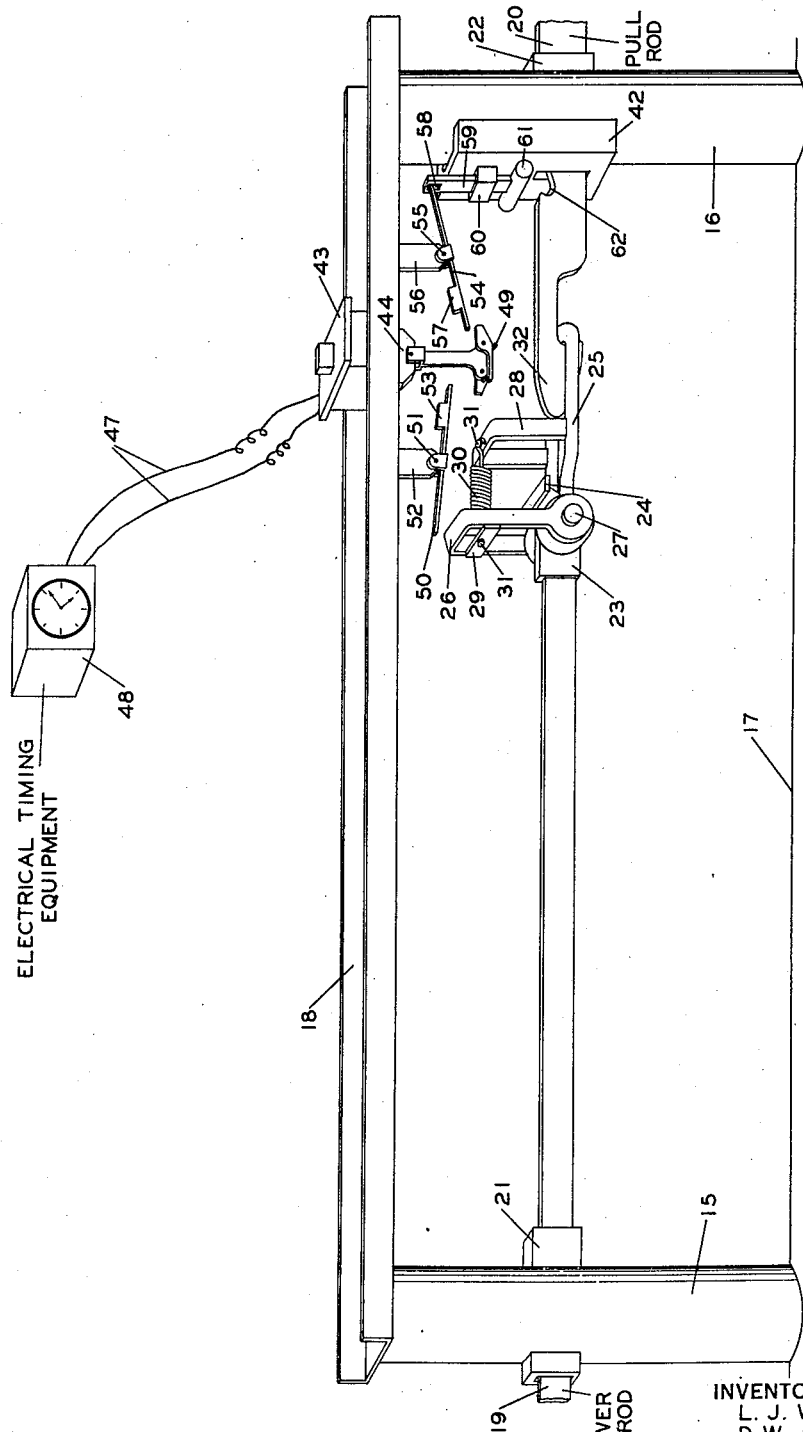
Figure 3 is the same form of our invention as shown in Figure 2, but with the apparatus depicted in hook-on position.

The form of our invention illustrated in Figures 2 and 3 is similar to the embodiment previously described in that it utilizes the same type of framework, and also the identical equipment on the end of the power rod. In this embodiment of the invention we employ two separate levers, which cooperate with a latch device, generally indicated by reference numeral 49, and a solenoid containing a slidable armature of the type described earlier in this specification, to effect alternate hook-ons and hook-offs between the power rod and the pull rod. The solenoid and armature arrangement in this instance is designed so that the armature will normally be maintained in a downward position due to its weight when the circuit is open, and will be urged upwardly when the solenoid is energized. A hook-on lever 50 is pivotally connected at 51 to an arm 52, which is disposed downwardly of channel 18. This lever is weighted at 53 so that it will normally assume the position shown in the drawings. A hook-off lever 54 is similarly pivoted at 55 to an arm 56 and is weighted at 57 so as to be normally tilted to the position illustrated in Figure 3 during pumping periods. It will be observed that when the weighted end of lever 54 is tilted downwardly, it will be closer to the latch device than lever 50 when its weighted end is in a corresponding tilted position (Figure 3). One end of lever 54 projects into slot 58 of a rod 59 that is vertically slidable in a collar 60 and carries a cylindrical bar 61 at its lower end which is adaptable to be wedged between a notched portion 62 on the pull rod and stop 42 in order to maintain the pull rod in a desired predetermined position when the coupling units are out of engagement.

Figure 11:
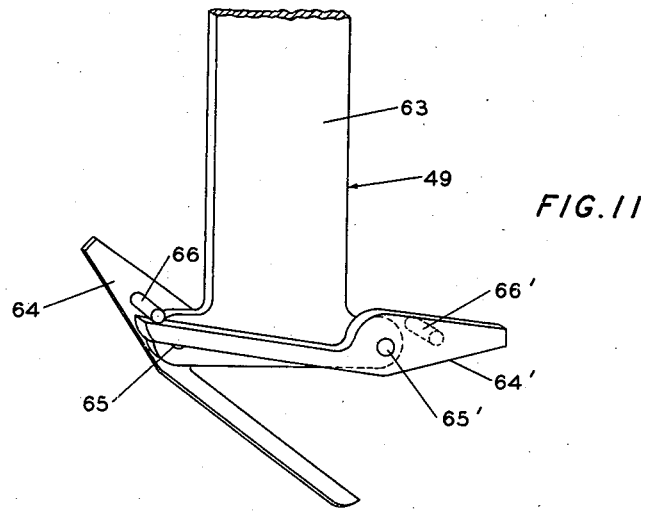
Figure 11 is an enlarged perspective view of the latch members illustrated in Figures 2 and 3.

Referring now to Figure 11, it will be noted that our latch device 49 consists of an arm 63, which is preferably a continuation of armature 44; a pair of tripping elements 64 and 64' pivotally mounted to arm 63 at 65 and 65' and normally positioned with respect to each other, as illustrated in Figures 2 and 3; and pins 66 and 66' which project sidewardly of elements 64 and 64', respectively.

In describing the mode of operation of the second embodiment of our invention, let us first assume that the apparatus is in hook-off position, as shown in Figure 2, with power rod 19 reciprocating through guide sleeve 21. The power rod continues to reciprocate back and forth until such time as the electrical timing equipment 48 completes the circuit to solenoid 43, thereby energizing the same to urge armature 44 and latch device 49 upwardly. Tripping element 64 strikes the right end of lever 50, tilting the same upwardly. At the same time, element 64 coacts with pin 66' to tilt element 64' upwardly and out of the way of the weighted end of lever 54. As the power rod moves toward the right on its next stroke, the upper edge of pull-up link 26 comes in contact with the left end of lever 50, and further movement of the power rod toward the right causes loop 25 to be raised and placed in contact with the lower outer curved portion of the hook. Continued movement of the power rod to the right causes loop 25 to ride along the lower outer curved portion of the hook and thence into the open portion of the hook on completion of the forward stroke. As the power rod starts its back stroke, loop 25 engages hook 32, moving hook 32 and pull rod 20 toward the left. Cylindrical bar 61 is now released from notch 62 and is raised upwardly, due to the excess weight 57 on lever 54. A complete hook-on will have been effected at this point. The electrical circuit is closed a sufficient time to allow for a few complete strokes of the pull rod in order to assure the accomplishment of a successful hook-on. After the well has been pumped for the desired period of time, the electric timing equipment again automatically completes the circuit to solenoid 43, and the armature 44 and latch device 49 are reactuated in an upward direction. Since the weighted end of lever 54 is lower than the weighted end of lever 50 when our apparatus is in hook-on position (Figure 3), tripping element 64' will contact lever 54, thereby tilting the same and lowering rod 59 so that bar 61 may be introduced into notch 62 as the pull rod moves to the right. This retains the pull rod in hook-off position. At the time that tilting element 64' actuates lever 54 it will cooperate with pin 66 to tilt element 64 upwardly so that the latter will clear lever 50. Power rod 19 continues for its full stroke to the right and loop 25 is moved into the open portion of hook 32. Loop 25 will then be tilted downwardly, due to the force of gravity, until pull-up link 26 rests against the rear edge of bar 24; and the power rod will then be completely disconnected from the pull rod.

Figures 4 and 5 illustrate a third embodiment of our invention wherein power rod 19 and pull rod 20 are arranged to reciprocate in and through sleeves 67 and 68, respectively, which are welded to angle irons 69 to form a rigid unitary structure. This structure may be mounted on a suitable type of support by conventional means at 70, if desired. A loop 71 is formed integral with a bell-like member 72, having parallel sides 73 and a flared top and bottom 74. A solenoid 75 contains an armature 76, slidably mounted therein, and is electrically connected to timing equipment 48 of the general class discussed earlier in this specification. An arm 77, provided with a weight 78 at one end, is pivotally connected at 79, 80, and 81 to brackets 82, connecting rod 83 and armature 76 in the order set forth. A cam 84 is pivotally connected to brackets 82 and connecting rod 83 at 85 and 86, respectively. A rod 87 extending through an opening in arm 77 and a collar 88 which is mounted on one end of sleeve 68, carries a cylindrical bar 61 at its lower extremity. Concentrically disposed with respect to rod 87 is a compressible spring 89 which is maintained against arm 77 through the coaction of a nut 90 and a washer 91 at the upper end of the rod. It will be observed that when the parts are in the relative positions illustrated in Figure 4, cylindrical bar 61 has been introduced into slot 62 and is firmly wedged between pull rod 20 and sleeve 68, thereby restraining the pull rod in a predetermined position.

For the purpose of outlining the mode of operation of the third embodiment of our invention, it is assumed that the apparatus is in the position illustrated in Figure 4 with cylindrical bar 61 in notch 62, maintaining pull rod 20 in a predetermined position, and with loop 71 out of engagement with hook 32. Electrical timing equipment 48 will, at the time for which it is set, close the electrical circuit and energize solenoid 75, thereby urging armature 76 and connecting rod 83 downwardly. This will cause cam 84 to tilt bell-like member 72 and raise loop 71. As the power rod moves to the left, loop 71 will contact and ride along the lower outer curved portion of hook 32 and thence into the open portion of the hook. On the next movement of the power rod 19 to the right, loop 71 will be firmly gripped in hook 32, moving pull rod 20 to the right also. As pull rod 20 starts to the right, cylindrical block 61 will be released from notch 62 and will move in an upward direction through the cooperation of armature 76, arm 77 and rod 87. A complete hook-on will have been effected at this point. Solenoid 75 remains energized during the entire pumping period, at the end of which time it is de-energized by the opening of the electrical circuit, permitting armature 76 to again move upwardly and cylindrical bar 61 to move downwardly. Bar 61 will be urged into notch 62 on the next stroke of pull rod 20 to the left and loop 71 will, due to its weight, fall downwardly and out of engagement with hook 32 to thereby complete the hook-off operation.

Figure 12:
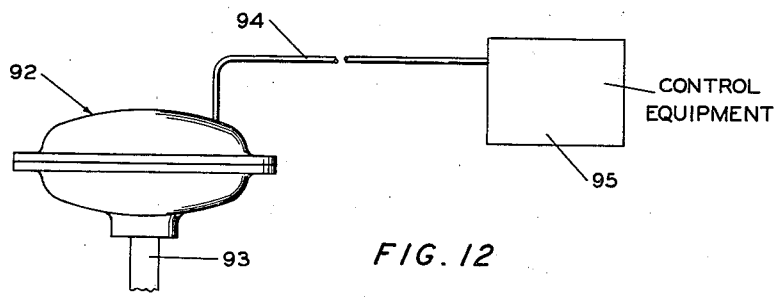
Figure 12 represents a diaphragm motor which may be substituted for the solenoids shown in Figures 1 and 2.
Figure 13:
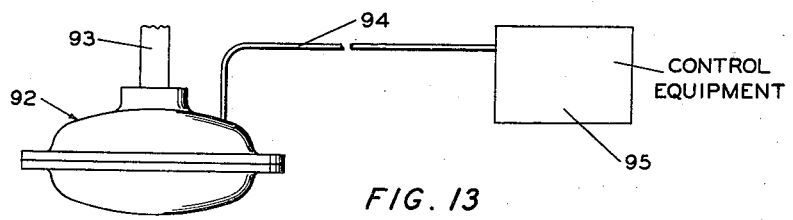
Figure 13 represents a diaphragm motor which may be substituted for the solenoid shown in Figures 3 and 4.

Many wells which are produced on pull rods, are situated in isolated localities where electric power is not readily available and it is neither practical nor economical to install suitable electric generating equipment to operate our apparatus. In such cases we contemplate the use of fluid operated means for actuating our apparatus to effect alternate hook-ons and hook-offs at desired times. Two examples of satisfactory types of fluid operated means are illustrated in Figures 12 and 13. The apparatus shown in Figure 12 may be substituted for the electrical means denoted in Figures 1 and 2, while the apparatus illustrated in Figure 13 may be used in place of the electrical means shown in Figures 3 and 4. This apparatus includes a diaphragm motor 92 of a type commonly known in the art, having a plunger 93 slidable therethrough. The plunger serves the same function as the various armatures shown in the other drawings. A conduit 94, for conveying a suitable fluid, such as compressed air or natural gas, to the diaphragm motor, is connected to appropriate control equipment 95. The control equipment includes a source of fluid supply under pressure and mechanical or electrical means for intermittently supplying the fluid to the diaphragm motor for the purpose of actuating the plunger 93. It will be noted that conduit 94 communicates with the end of the diaphragm motor opposite the plunger in Figure 12, but communicates with the plunger end of the diaphragm motor in Figure 13. In each instance the plunger is actuated when fluid pressure is applied to the diaphragm motor, but returns to normal position when such pressure is relieved. The diaphragm motor of Figure 13 is inverted when used in place of the electrical means shown in Figure 3.

If our apparatus should fail to operate due to various causes, such as interruptions in electric service or failure in the fluid supply system, we may nevertheless successfully effect engagement and disengagement of the coupling units at desired times, pending completion of necessary repairs. It is obvious that the slidable members 44, 44', and 76, or the different tripping means employed herein may be manually actuated whenever necessary or desirable to alternately place the reciprocating members in and out of engagement with each other. It is also evident that our invention is capable of being remotely operated manually and is not dependent upon the electrical or fluid pressure systems for actuation.

From the foregoing it is believed that the construction, operation, objects and advantages of our present invention will be readily apparent to persons skilled in the art. It is to be clearly understood, however, that the forms of our invention herewith shown and described are to be taken as preferred examples of the same and that various changes in the shape, size and arrangement of parts may be resorted to without departing from the spirit of our invention, as defined by the appended claims.

We claim:

1. In remotely controlled apparatus for connecting and disconnecting a reciprocating power transmitting member to and from a reciprocating power utilizing member, the combination comprising a coupling including a unit connected to one of the reciprocating members and a unit connected to the other reciprocating member, means for effecting engagement between the coupling units on a forward movement of the power transmitting member, means for maintaining the power utilizing member in a predetermined position when the coupling units are out of engagement, and remotely controlled means for actuating both aforementioned means to place the coupling units alternately in and out of engagement with each other.

2. In remotely controlled apparatus for connecting and disconnecting a reciprocating power transmitting member to and from a reciprocating power utilizing member, the combination comprising a coupling including a unit connected to one of the reciprocating members and a unit connected to the other reciprocating member, means for effecting engagement between the coupling units on a forward movement of the power transmitting member, means for maintaining the power utilizing member in a predetermined position when the coupling units are out of engagement, and remotely controlled electrically operated means for actuating both aforementioned means to place the coupling units alternately in and out of engagement with each other.

3. In remotely controlled apparatus for connecting and disconnecting a reciprocating power transmitting member to and from a reciprocating power utilizing member, the combination comprising a coupling including a unit connected to one of the reciprocating members and a unit connected to the other reciprocating member, means for effecting engagement between the coupling units on a forward movement of the power transmitting member, means for maintaining the power utilizing member in a predetermined position when the coupling units are out of engagement, and remotely controlled fluid operated means for actuating both aforementioned means to place the coupling units alternately in and out of engagement with each other.

4. In remotely controlled apparatus for connecting and disconnecting a reciprocating power transmitting member to and from a reciprocating power utilizing member, the combination comprising a coupling including a unit connected to one of the reciprocating members and a unit connected to the other reciprocating member, slidable means, means cooperating with one of the coupling units and the slidable means for effecting engagement between the coupling units on a forward movement of the power transmitting member, means cooperating with the slidable means for maintaining the power utilizing member in a predetermined position when the coupling units are out of engagement, and remotely controlled means for actuating the slidable means to place the coupling units alternately in and out of engagement with each other.

5. In remotely controlled apparatus for connecting and disconnecting a reciprocating power transmitting member to and from a reciprocating power utilizing member, the combination comprising a coupling including a unit connected to one of the reciprocating members and a unit connected to the other reciprocating member, slidable means, means cooperating with one of the coupling units and the slidable means for effecting engagement between the coupling units on a forward movement of the power transmitting member, means cooperating with the slidable means for maintaining the power utilizing member in a predetermined position when the coupling units are out of engagement, and remotely controlled electrically operated means for actuating the slidable means to place the coupling units alternately in and out of engagement with each other.

6. In remotely controlled apparatus for connecting and disconnecting a reciprocating power transmitting member to and from a reciprocating power utilizing member, the combination comprising a coupling including a unit connected to one of the reciprocating members and a unit connected to the other reciprocating member, slidable means, means cooperating with one of the coupling units and the slidable means for effecting engagement between the coupling units on a forward movement of the power transmitting member, means cooperating with the slidable means for maintaining the power utilizing member in a predetermined position when the coupling units are out of engagement, and remotely controlled fluid operated means for actuating the slidable means to place the coupling units alternately in and out of engagement with each other.

7. In remotely controlled apparatus for connecting and disconnecting a reciprocating power transmitting member to and from a reciprocating power utilizing member, the combination comprising a coupling including a unit connected to one of the reciprocating members and a unit connected to the other reciprocating member, slidable means, means associated with the slidable means for maintaining the power utilizing member in a predetermined position when the coupling units are out of engagement, a second slidable means, means cooperating with the second slidable means for effecting engagement between the coupling units on a forward movement of the power transmitting member, and remotely controlled means for actuating each of the aforementioned slidable means to place the coupling units alternately in and out of engagement with each other.

8. In remotely controlled apparatus for connecting and disconnecting a reciprocating power transmitting member to and from a reciprocating power utilizing member, the combination comprising a coupling including a unit connected to one of the reciprocating members and a unit connected to the other reciprocating member, slidable means, means associated with the slidable means for maintaining the power utilizing member in a predetermined position when the coupling units are out of engagement, a second slidable means, means cooperating with the second slidable means for effecting engagement between the coupling units on a forward movement of the power transmitting member, and remotely controlled electrically operated means for actuating each of the aforementioned slidable means to place the coupling units alternately in and out of engagement with each other.

9. In remotely controlled apparatus for connecting and disconnecting a reciprocating power transmitting member to and from a reciprocating power utilizing member, the combination comprising a coupling including a unit connected to one of the reciprocating members and a unit connected to the other reciprocating member, slidable means, means associated with the slidable means for maintaining the power utilizing member in a predetermined position when the coupling units are out of engagement, a second slidable means, means cooperating with the second slidable means for effecting engagement between the coupling units on a forward movement of the power transmitting member, and remotely controlled fluid operated means for actuating each of the aforementioned slidable means to place the coupling units alternately in and out of engagement with each other.

10. In remotely controlled apparatus for connecting and disconnecting a reciprocating power transmitting member to and from a reciprocating power utilizing member, the combination comprising a coupling including a unit connected to one of the reciprocating members and a unit connected to the other reciprocating member, single slidable means, means associated with the slidable means for maintaining the power utilizing member in a predetermined position when the coupling units are out of engagement, means cooperating with the slidable means for effecting engagement between the coupling units on a forward movement of the power transmitting member, the two last mentioned means being constructed and arranged to place the coupling units in engagement upon movement of the slidable means in one direction and to disengage the coupling units upon the next succeeding movement of the slidable means in the same direction, and remotely controlled means for actuating the slidable means.

11. In remotely controlled apparatus for connecting and disconnecting a reciprocating power transmitting member to and from a reciprocating power utilizing member, the combination comprising a coupling including a unit connected to one of the reciprocating members and a unit connected to the other reciprocating member, single slidable means, means associated with the slidable means for maintaining the power utilizing member in a predetermined position when the coupling units are out of engagement, means cooperating with the slidable means for effecting engagement between the coupling units on a forward movement of the power transmitting member, the two last mentioned means being constructed and arranged to place the coupling units in engagement upon movement of the slidable means in one direction and to disengage the coupling units upon the next succeeding movement of the slidable means in the same direction, and remotely controlled electrically operated means for actuating the slidable means.

12. In remotely controlled apparatus for connecting and disconnecting a reciprocating power transmitting member to and from a reciprocating power utilizing member, the combination comprising a coupling including a unit connected to one of the reciprocating members and a unit connected to the other reciprocating member, single slidable means, means associated with the slidable means for maintaining the power utilizing member in a predetermined position when the coupling units are out of engagement, means cooperating with the slidable means for effecting engagement between the coupling units on a forward movement of the power transmitting member, the two last mentioned means being constructed and arranged to place the coupling units in engagement upon movement of the slidable means in one direction and to disengage the coupling units upon the next succeeding movement of the slidable means in the same direction, and remotely controlled fluid operated means for actuating the slidable means.

13. In remotely controlled apparatus for connecting and disconnecting a reciprocating power transmitting member to and from a reciprocating power utilizing member, the combination comprising a coupling including a unit connected to one of the reciprocating members and a unit connected to the other reciprocating member, single slidable means, means associated with the slidable means for maintaining the power utilizing member in a predetermined position when the coupling units are out of engagement, means cooperating with the slidable means for effecting engagement between the coupling units on a forward movement of the power transmitting member, the two last mentioned means being constructed and arranged to place the coupling units in engagement upon movement of the slidable means in one direction and to disengage the coupling units upon the next succeeding movement of the slidable means in the opposite direction, and remotely controlled means for actuating the slidable means.

14. In remotely controlled apparatus for connecting and disconnecting a reciprocating power transmitting member to and from a reciprocating power utilizing member, the combination comprising a coupling including a unit connected to one of the reciprocating members and a unit connected to the other reciprocating member, single slidable means, means associated with the slidable means for maintaining the power utilizing member in a predetermined position when the coupling units are out of engagement, means cooperating with the slidable means for effecting engagement between the coupling units on a forward movement of the power transmitting member, the two last mentioned means being constructed and arranged to place the coupling units in engagement upon movement of the slidable means in one direction and to disengage the coupling units upon the next succeeding movement of the slidable means in the opposite direction, and remotely controlled electrically operated means for actuating the slidable means.

15. In remotely controlled apparatus for connecting and disconnecting a reciprocating power transmitting member to and from a reciprocating power utilizing member, the combination comprising a coupling including a unit connected to one of the reciprocating members and a unit connected to the other reciprocating member, single slidable means, means associated with the slidable means for maintaining the power utilizing member in a predetermined position when the coupling units are out of engagement, means cooperating with the slidable means for effecting engagement between the coupling units on a forward movement of the power transmitting member, the two last mentioned means being constructed and arranged to place the coupling units in engagement upon movement of the slidable means in one direction and to disengage the coupling units upon the next succeeding movement of the slidable means in the opposite direction, and remotely controlled fluid operated means for actuating the slidable means.

16. In remotely controlled apparatus for connecting and disconnecting a reciprocating power rod to and from a reciprocating pull rod in a well pumping system, the combination comprising a coupling including a unit pivotally connected to one of the reciprocating rods and a unit connected to the other reciprocating rod, slidable means, means associated with the slidable means for maintaining the pull rod in a predetermined position when the coupling units are out of engagement, a second slidable means, means cooperating with the second slidable means and the pivotally connected unit for effecting engagement between the coupling units on a forward movement of the power rod, and remotely controlled means for actuating each of the aforementioned slidable means to place the coupling units alternately in and out of engagement with each other.

17. In remotely controlled apparatus for connecting and disconnecting a reciprocating power rod to and from a reciprocating pull rod in a well pumping system, the combination comprising a coupling including a unit pivotally connected to one of the reciprocating rods and a unit connected to the other reciprocating rod, single slidable means, means associated with the slidable means for maintaining the pull rod in a predetermined position when the coupling units are out of engagement, means cooperating with the slidable means and the pivotally connected unit for effecting engagement between the coupling units on a forward movement of the power rod, the two last mentioned means being constructed and arranged to place the coupling units in engagement upon movement of the slidable means in one direction and to disengage the coupling units upon the next succeeding movement of the slidable means in the same direction, and remotely controlled means for actuating the slidable means.

18. In remotely controlled apparatus for connecting and disconnecting a reciprocating power rod to and from a reciprocating pull rod in a well pumping system, the combination comprising a coupling including a unit pivotally connected to one of the reciprocating rods and a unit connected to the other reciprocating rod, single slidable means, means associated with the slidable means for maintaining the pull rod in a predetermined position when the coupling units are out of engagement, means cooperating with the slidable means and the pivotally connected unit for effecting engagement between the coupling units on a forward movement of the power rod, the two last mentioned means being constructed and arranged to place the coupling units in engagement upon movement of the slidable means in one direction and to disengage the coupling units upon the next succeeding movement of the slidable means in the opposite direction, and remotely controlled means for actuating the slidable means.

DONALD W. AULD.
LOUIS J. WEBER.